Figure 1:
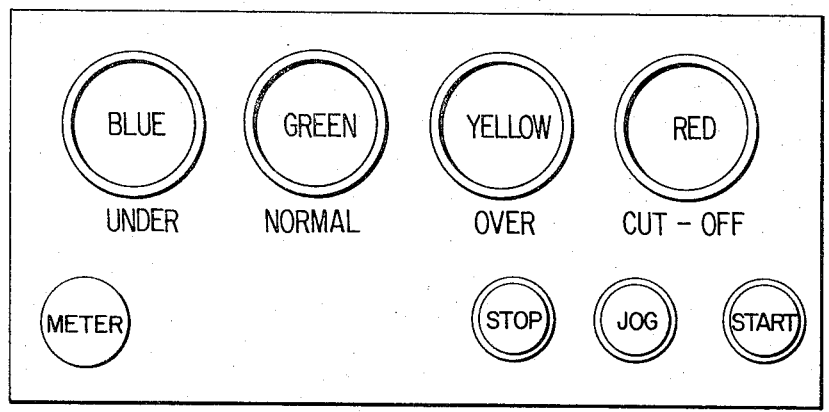

United States Patent [19]
Krause et al.

[11] 3,809,985
[45] May 7, 1974

[54] SOLID STATE A/C MOTOR PROTECTOR SYSTEM

[75] Inventors: Stephen R. Krause; Nelson Hendler, both of Baltimore, Md.

[73] Assignee: Pro-Lect, Inc., Baltimore, Md.

[22] Filed: Apr. 6, 1973

[21] Appl. No.: 348,668

[52] U.S. Cl............... 318/490, 317/13 R, 340/253
[51] Int. Cl............................................. H02p 3/00
[58] Field of Search................. 317/13 R; 318/490; 340/253

[56] References Cited
UNITED STATES PATENTS

| | | | |
|---|---|---|---|
| 3,283,236 | 11/1966 | Legg | 317/13 R |
| 2,719,966 | 10/1955 | Schurr | 318/490 X |
| 2,718,631 | 9/1955 | Peck | 318/490 X |
| 2,736,009 | 2/1956 | Barnickel | 318/490 X |
| 3,248,609 | 4/1966 | Gambale | 317/26 X |
| 3,581,179 | 5/1971 | Jones | 317/13 R X |

Primary Examiner—B. Dobeck
Attorney, Agent, or Firm—Wilfred G. Caldwell

[57] ABSTRACT

Apparatus and method for protecting a current drawing load, such as a motor, from excessive overload using logic to open a contactor between the source and load. Overlapping windows or ranges of load current magnitude show the conditions of load including trend of the load current. Threshold sensing of a predetermined level disconnects the load and so indicates. Single or multiple phases may be sensed and indicated while maintaining protective disconnect capabilities for single or multiphase loads.

10 Claims, 9 Drawing Figures

SOLID STATE A/C MOTOR PROTECTOR SYSTEM

INTRODUCTION

The present invention is a solid state a/c Motor Protector System, which constantly senses the motor load current, processes this information, and selectively activates one or two of four-colored light bulbs, to indicate the state of the motor at any instant. If, for some reason, the motor has a detrimental overload, the electronics disables the electrical contactor and stops the motor; thus, avoiding burn-out. The system can be used to protect a/c motors of: 10, 30 - 110v, 220v or 460v up to 50 amp. full load. For higher current ratings, the current transformer of the system can be modified; thus, motors ranging up to e.g., 500 amp. can be protected.

A purpose of the present invention is to provide a system with a front panel having four colored light bulbs, three control pushbuttons and one indicating meter. A remote indicator box can also be provided as an option, which has the same basic four bulb indicators and two START and STOP control pushbuttons.

In a 30 motor application, each leg can have a separate sensing circuit, and phase processing electronics; however, experience has shown that sensing only one leg and processing that information, serves the same purpose as sensing three legs individually. For any symmetrically wound multi-phase motor, when any one phase faults the remaining phases are over or under loaded; and, hence, any one phase sensing achieves the same results, which reduces the system cost almost to 30 percent.

A still further object of the present invention is to provide protection to a/c motors of wide ranges and prevent the motors from burning out due to overheating. As a motor is overloaded, its windings generate more heat. This heat deteriorates the winding insulation and ultimately results in burning the winding. The present protector system is completely solid state; and, hence, it helps to prolong motor life.

The prior art thermal motor protectors work on the termperature rise; and before such a system acts in cutting the power, the motor winding's temperature has already risen considerably, and a certain degree of deterioration of the winding insulation has already taken place.

Another disadvantage of the thermal breaker types is that they are very slow acting. The thermal breakers work on heat, which is a derivative of current; and, hence, on indirect sensing.

The present Motor Protector accurately monitors the motor current and indicates the motor current state by four colored indicator light bulbs. The system has a panel meter, which constantly and instantly indicates the motor load current.

FRONT PANEL DISPLAY

FIG. 1 is a schematic of the front panel display. It shows four colored light bulbs and three control pushbuttons and one meter. The light indicators indicate the following load conditions:

BLUE: Under Load Condition
This light comes on at about 54 percent of load and stays on until about 96 percent of load.
GREEN: Normal Load Condition
This light lights up at about 84 percent of full load and stays on until about 108 percent of load.

YELLOW: Warning Overload
This light comes on at 102 percent of load and stays on until cut-off, which is about 120 percent load.
RED: Cut-Off
This light comes on when the motor has detrimental overload, e.g., for a small 5 HP motor, 120 percent may cause burn out of insulation. When this light is on, the motor is automatically stopped. The light stays lit until it is reset by depressing STOP pushbutton. If this light is on, pressing START button will not start the motor.

All of the above percent load numbers are typical values and will change according to the size and rating of the motor. These numbers, for a particular motor, will have to be determined from the manufacturer's safe temperature rise data for the motor. The system offers flexibility to change these settings very easily.

It will be observed from the above numbers that an overlapping situation on the indicator light bulbs occurs in BLUE and GREEN, and GREEN and YELLOW modes. This is a special feature of the system and tells the viewer how the motor load is changing. Hence, with four lights, a total of six motor states or modes are indicated.

1. BLUE: The motor is running at underload.
2. BLUE-GREEN: The motor is running at underload but approaching normal load.
3. GREEN: The motor is running at normal load.
4. GREEN-YELLOW: The motor is approaching overload but still safe in running.
5. YELLOW: The motor is running on overload and sustained running in this mode may cause damage to the motor.
6. RED: The motor is stopped, because a detrimental overload situation has been sensed.

Figure 2:
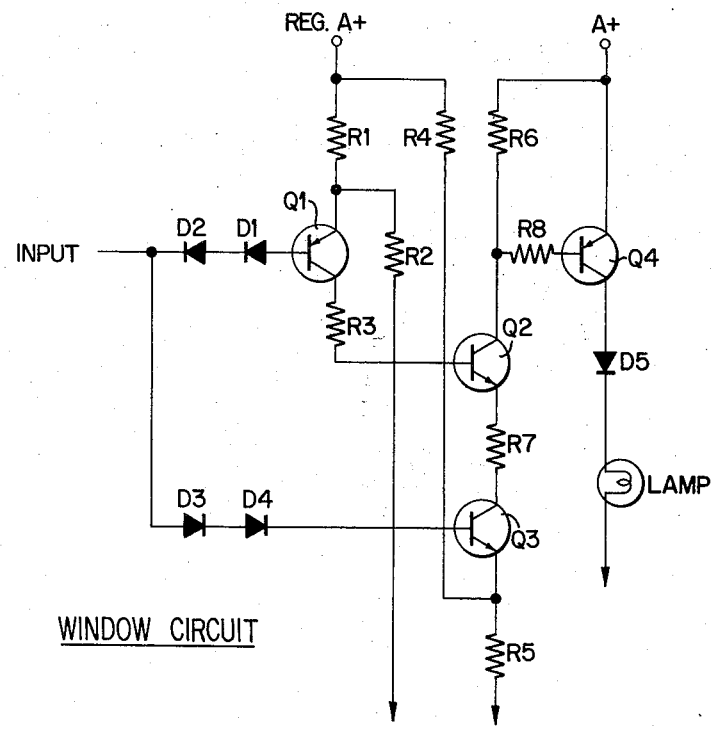
Figure 4:
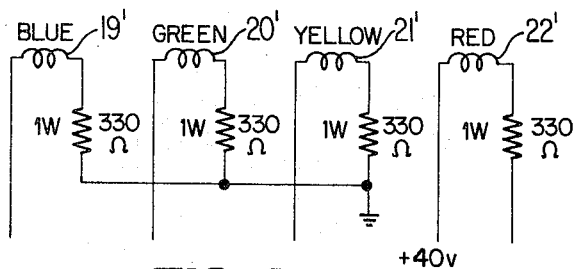
Figure 3:
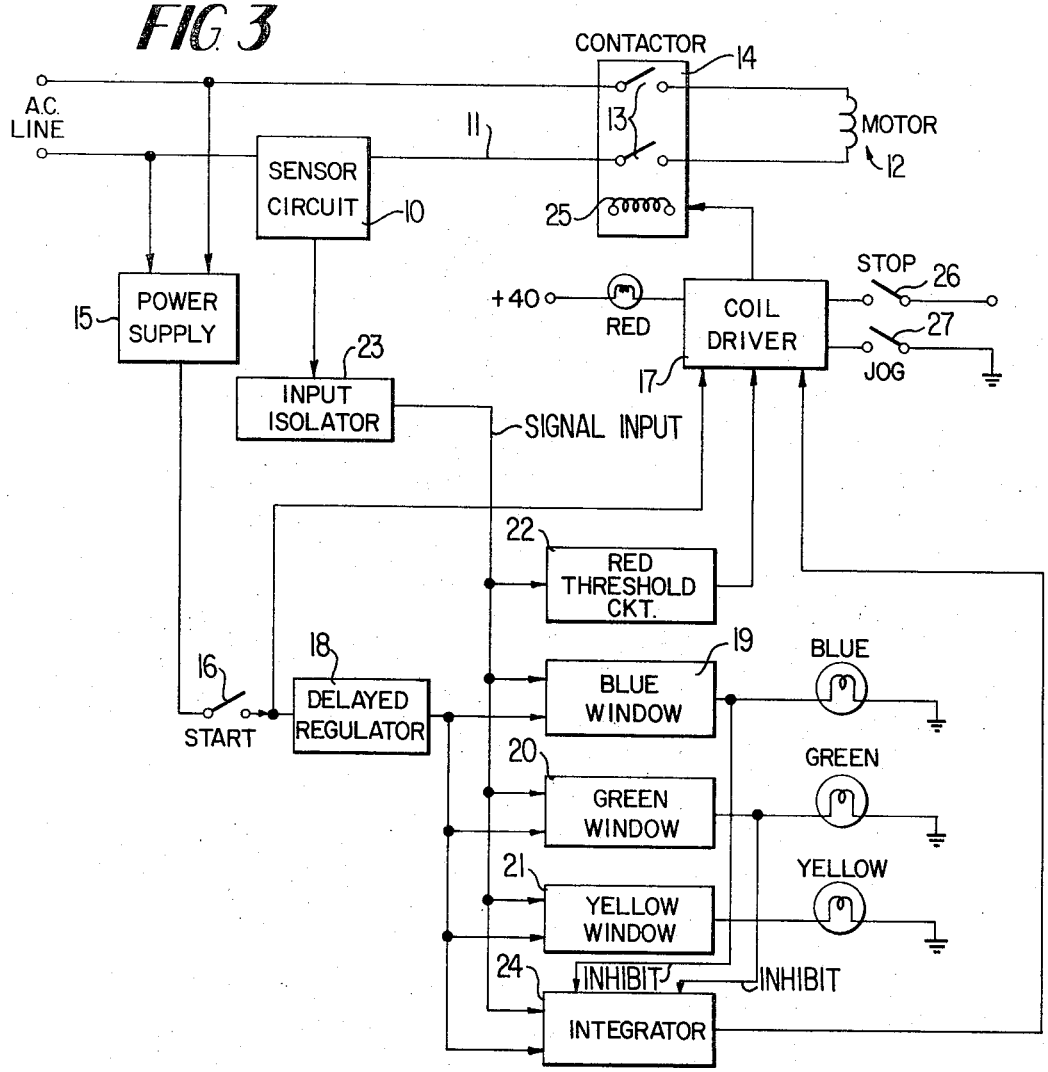
Figure 5:
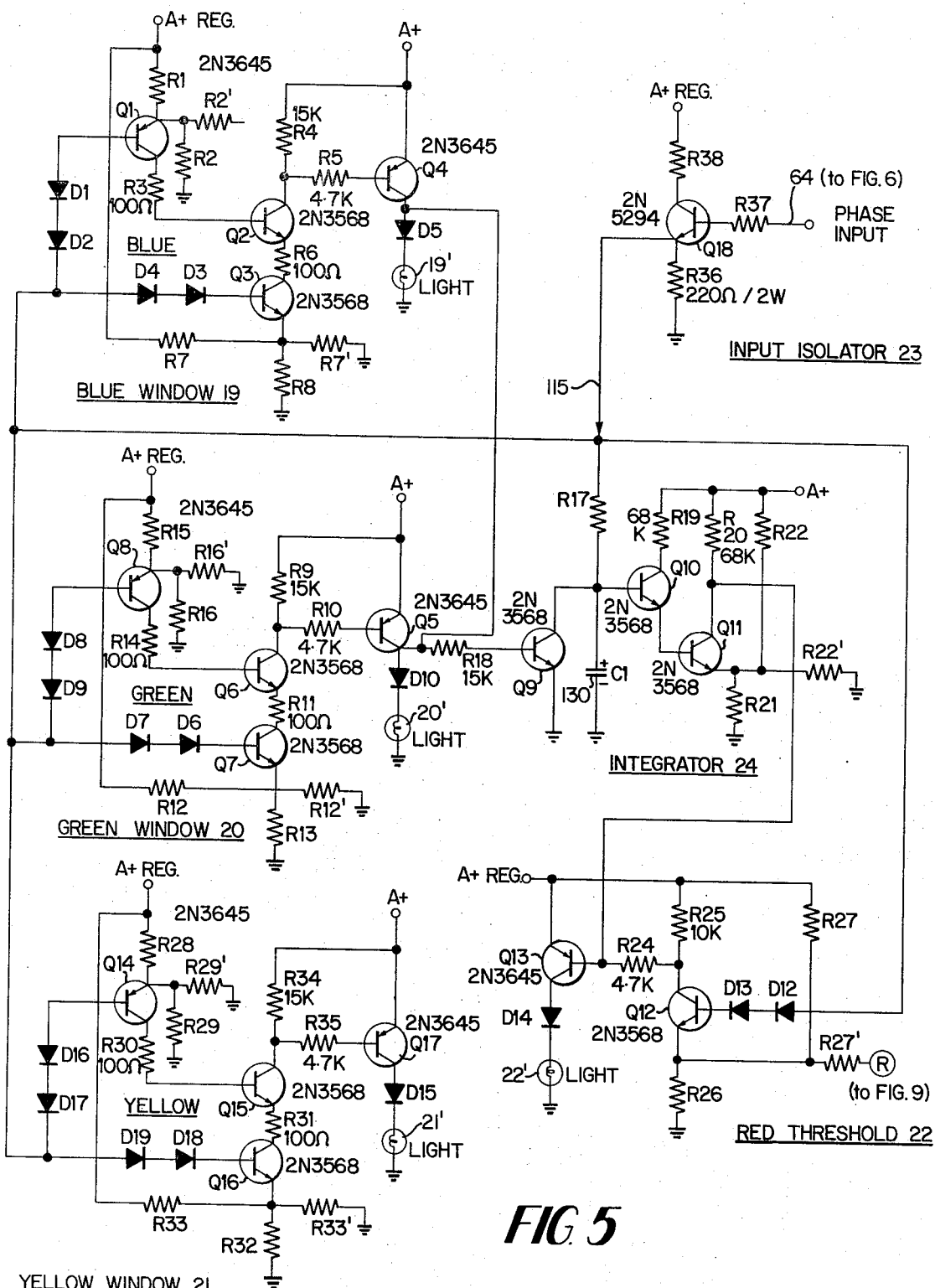
Figure 6:
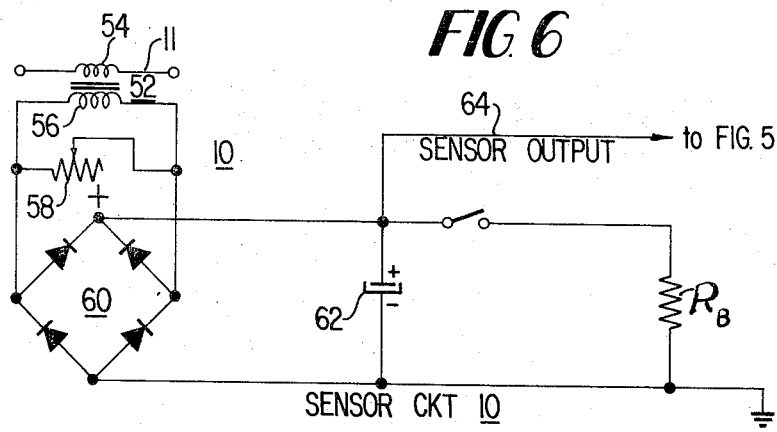
Figure 7:
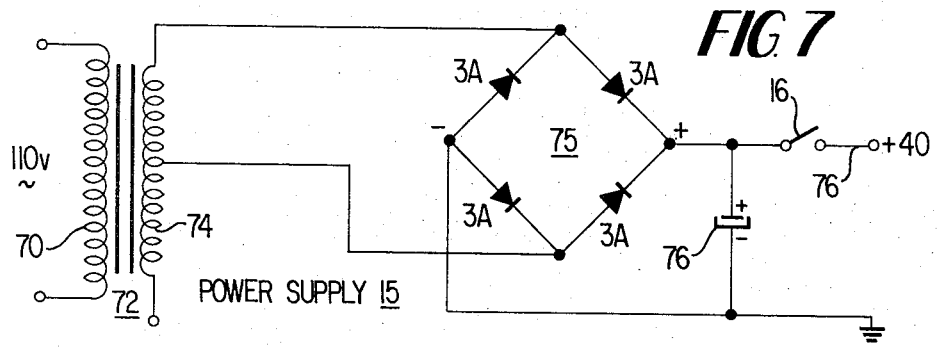
Figure 8:
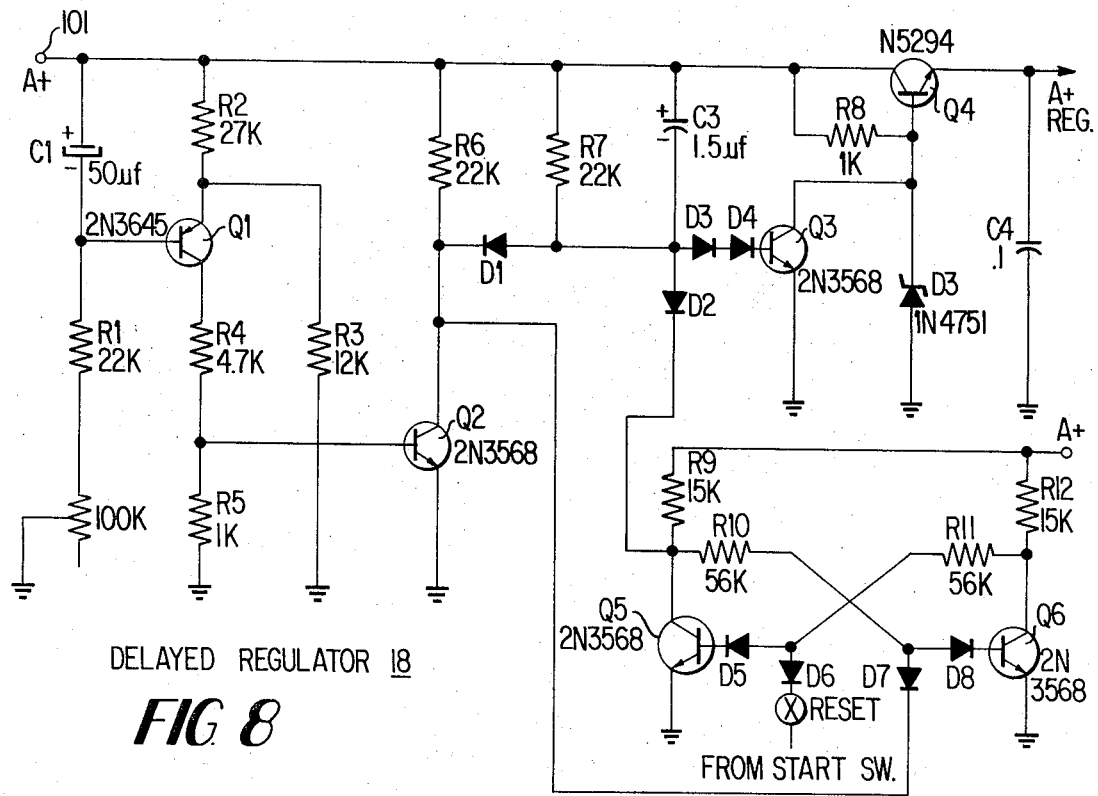
Figure 9:
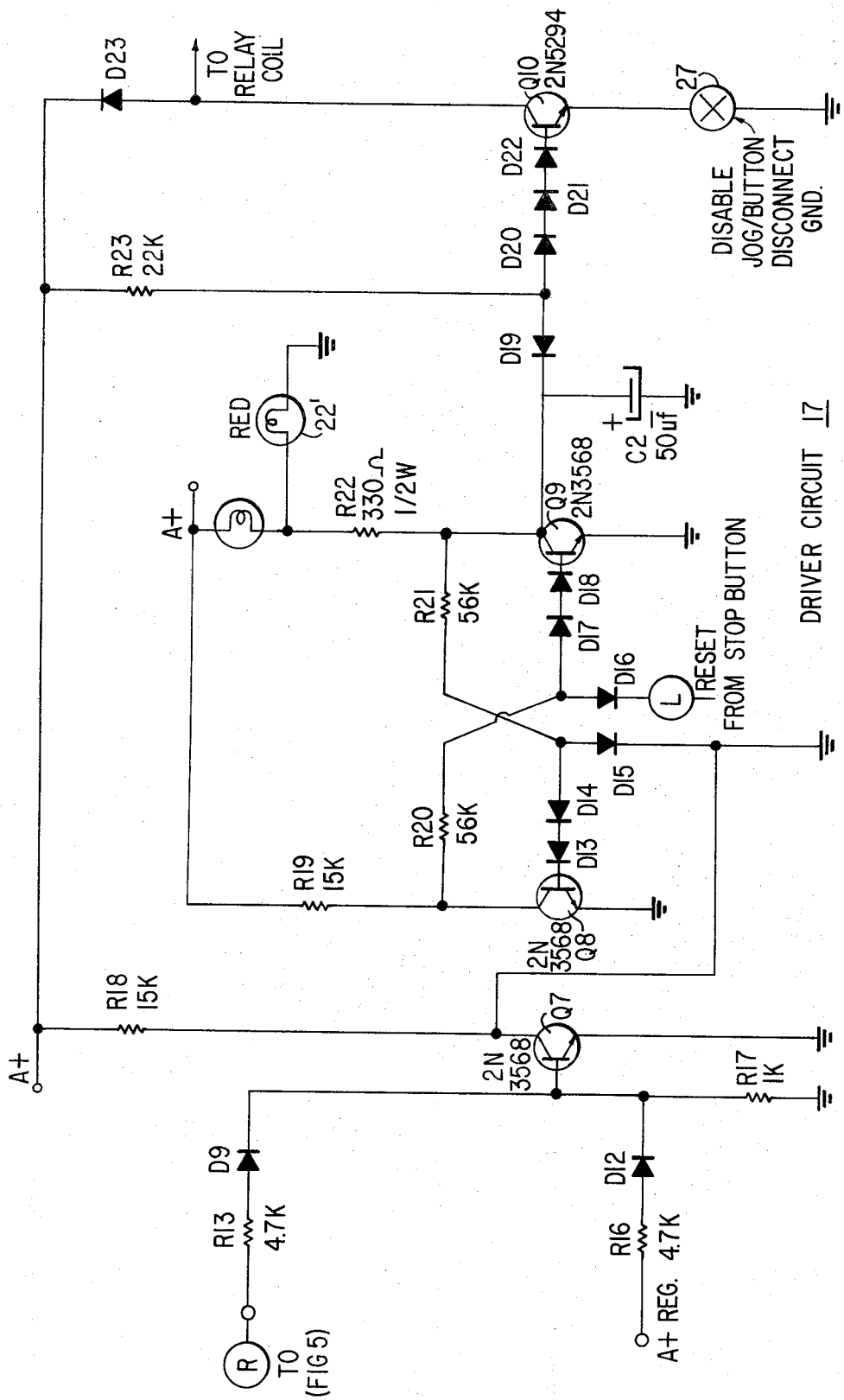

In the drawings:
FIG. 1 shows the panel,
FIG. 2 is a typical window circuit,
FIG. 3 is a block diagram showing the operative components interconnected,
FIG. 4 shows a portion of the light circuitry,
FIG. 5 is a circuit diagram of the BLUE, GREEN and YELLOW window circuits in connection with the input isolator, integrator and RED threshold circuitry,
FIG. 6 is the sensor circuit,
FIG. 7 shows the power supply,
FIG. 8 is the delayed regulator, and
FIG. 9 shows the driver circuit.

The panel also has three control pushbuttons, whose functions are as follows:
START: By pressing this button, the motor is started, the button is automatically held depressed once the motor is started. It returns to OFF state when the motor is turned off.
JOG: THis bypasses electronics. By pressing this button the motor can be started and kept running as long as the button is held down.
STOP: By pressing this button the motor can be stopped. This also resets the electronics.

PANEL METER

It is a d.c. voltmeter of 0–50v full scale range and is calibrated in per cent load. The meter face may include a "set" mark (not shown) on it to correspond to 100 percent of load. The meter continuously indicates the motor load current.

SPECIAL FEATURES OF THE SYSTEM

1. Starting Delay

In order to avoid damage to the system due to heavy starting current and prevent the system from being thrown into cut-off mode, the system has an adjustable delay built in from 205 sec. to 10 sec. The electronics winding curcuits are inactivated during this motor start-up period. This function is accomplished by using a delayed power regulator, described in detail hereafter.

2. Integrator

Besides the four indicator windows, the system has an integrator circuit. The purpose of this block is to shut off the motor if it runs in warning overload mode for too long a period to cause damage to the motor. The integrator starts timing out when the motor passes the normal GREEN mode and goes into the warning overload — YELLOW mode. If after going into the YELLOW mode, the motor reverts back into GREEN mode, the integrator resets to zero time and starts timing again when it goes into YELLOW mode the next time.

The integrator time has an inverse slope characteristic with respect to load, i.e., as the load increases, the threshold integrator time decreases; and, hence, at higher load currents, the motor is shut off sooner than in lower load currents. Depending upon the size and rating of the motor, the set integrator time can be varied up to 90 seconds.

3. Fail-Safe

The system has been designed so that any failure will result in shutting the motor 12 (FIG. 4) off. The power for the control electronics is drawn from the same line on which the sensing current transformer of sensor circuit 10 is connected, so that any open line failure will reflect on this line. The power to the motor is supplied through the actuated contacts 13 of the contactor. Any loss of power will de-energize the actuator 25, thereby shutting the motor off.

4. Jog Bypass

The JOG button 27 provided on the panel completely bypasses the electronics and enables the motor to run for temporary overload, such as changing fly wheels, etc.

5. Cut-Off Check and Lock-Out

When the system is first turned on, the RED light 22' lights up. This ensures the proper operation of cut-off circuitry. Also, once the RED light is on, the motor 12 cannot be started by pressing the start button. The RED light 22' has to be reset, by depressing the stop button 26.

6. Ease of Start and Stop

The system offers very small, easy-to-press start and stop buttons and eliminates turning on and off of heavy breakers.

Referring now to FIG. 3, the functional block diagram for a single phase sensing motor protector system; for multiphase motors, the same block diagram applies except that the contactor 14 may have as many sets of contacts as number of phases, if more than a single phase is monitored.

The current transformer of the sensing circuit 10 is inserted in series with one leg 11 of the a.c. line; and, thus, draws the motor current when the motor 12 is running. The motor 12 is given power by the contacts 13 of the contactor 14, whose coil 25 is controlled by the electronics. The a.c. power lines also feed inputs to the primary of the power supply transformer 15. The power supply block output is 40v d.c. The start button 16 allows this + 40v to be given to the contactor coil driver 17. Start button 16 has a holding coil (not shown), and is driven in parallel with contactor coil 25. Depressing the start button 16 gives +40v to coil driver 17, which energizes the coil(s) and the contactor contacts 13 are closed, giving the power to the motor 12 — so it runs. Start button 16 also supplies power to the delayed regulator 18, which supplies a regulated output of +30v after the starting delay period is over. This regulated d.c. establishes the threshold points for lighting of BLUE 19, GREEN 20, YELLOW 21 windows (FIG. 3) and RED threshold circuit 22.

The sensor circuit 10 gives a low secondary current of about 1 amp. The load current is converted into the analog voltage; and this signal voltage, through input isolator block 23, is fed as the input to all threshold windows and an integrator 24. When the signal falls in the range of a particular window, that window turns on and the corresponding light is turned on. The integrator block 24 has the signal input and also two inhibit inputs coming from outputs of the BLUE and GREEN windows, respectively. Thus, if either of these windows is on, the integrator block 24 stays off. So it is only when the YELLOW window 21 turns on that the integrator block 24 starts functioning.

The integrator output is connected to the coil driver 17; thus, when it turns on, the coil 25 is deactivated and the motor 12 is stopped. The output of the RED threshold block 22 is also connected to the coil driver 17, so that it achieves the same function.

Stop button 26 de-energizes the coil 25 to stop the motor 12, while jog button 27 gives ground directly to the coil 25 so that it is energized — bypassing the electronics control signals.

THE WINDOW CIRCUITS

The window circuits are shown in FIG. 2. Each circuit uses very few, inexpensive semiconductors. As the name suggests, the window circuit gives an output during a certain window of input.

This circuit consists of four small power silicon transistors, eight resistors and five small silicon diodes. The input to the circuit is the variable analog voltage. $Q_1$ is a PNP transistor, whose emitter is biased at a certain voltage by the voltage divider $R_1$ and $R_2$. This establishes the upper limit of the window. $Q_3$ is an NPN transistor and its emitter is clamped at a certain voltage by the voltage divider consisting of $R_4$ and $R_5$. This divider establishes the lower limit of the window. $D_1$, $D_2$, $D_3$, and $D_4$ are biasing diodes. Now, if the $Q_1$ emitter is set at a high potential, i.e., $V_H$, $Q_1$ emitter-base junction will draw the current as long as the input is below $V_H$ minus the base to emitter voltage minus the voltage across $D_1$ and $D_2$, i.e., $V_H - V_{BE} - V_{D1} - V_{D2}$, which is approximately $V_H - 1.8v$. Hence, $Q_1$ is enabled on, when the input is less than $V_H - 1.8v$. When the input exceeds $V_H - 1.8v$, $Q_1$ is turned off.

If $Q_3$ emitter is set at $V_L$, then $Q_3$ is enabled when the input exceeds $V_L + V_{BE} + V_{D3} + V_{D4}$, this is approximately $(V_L + 1.8v)$. Hence, $Q_3$ is enabled on when the input exceeds $V_L + 1.8v$ and is cut off, when the input gets below $V_L + 1.8v$. The NPN transistor $Q_2$ has its base-emitter junction in series with $Q_1$ and $Q_3$ collectors. Therefore, $Q_2$ can be enabled on only when both $Q_1$ and $Q_3$ are turned on. Looking at the threshold limits of $Q_1$ and $Q_3$, they both are on for inputs exceeding $(V_L + 1.8)$ and below $(V_H - 1.8)$ so for the input window from $(V_L + 1.8)$ to $(V_H - 1.8)$, $Q_2$ is enabled on. For any other input level outside this window, either $Q_1$ or $Q_3$ is turned off; and, hence, $Q_2$ is turned on only in the window $(V_L + 1.8)$ to $(V_H - 1.8)$. $Q_2$, when turned on, allows the base drive path for the PNP lamp driver transistor $Q_4$, enabling it to turn on and light the lamp. $R_3$ and $R_7$ are current limiters. $R_8$ is the base current limiter for $Q_4$. $R_6$ is the collector current limiter for $Q_2$. $D_5$ is the isolating diode, isolates $Q_4$ collector, to be taken out, away from the lamp.

$Q_1$ and $Q_3$ emitter clamp voltage dividers are driven off the regulator, so that they maintain constant trigger points irrespective of the line voltage variations. It can be readily seen that by adjusting the $Q_1$ $Q_3$ emitter clamp voltage dividers, a wide range of windows can be obtained. The cut-in and cut-out levels of a window can be controlled within 100mv. Since the calibration constant for the system is 16.33v = 100 percent or 1v = 6 percent, a 100mv sensitivity will mean, a load variation of .6 percent can be accurately controlled.

This unique window circuit is very simple and has numerous applications.

THE SENSOR CIRCUIT

Referring now to FIG. 6, the sensor circuit is shown at 10. The sensor circuit, senses the a.c. load current via current transformer 52, and gives out a proportional analog d.c. voltage. The circuit consists of a primary winding 54 in series with the motor line or leg 11 so that the motor current flows through the primary. The ratio of turns is such approximately 1 amp flows into the secondary winding 56, when the motor draws full load current. The secondary 56 has a 2k, 25w variable resistor 58, across which proportional a.c. voltage is developed. The four diode bridge rectifier 60 converts a.c. into d.c. and the 50 $\mu f$ - 5w capacitor 62 serves as a storage for the d.c. At the capacitor, d.c. sensing voltage is available which is the analog of the motor load current delivered at output lead 64. The sensor output sees a 220v/2w bleeder resistor $R_B$, which serves to bleed the output to zero, when the load current goes to zero. The bleeder improves the panel meter response and the pointer instantaneously returns to zero when the motor is stopped.

The calibration sensitivity has been selected to be 16.33v = 100% load, which is equivalent to 1v = 6%. To account for different full load currents of various motors, the 2k, 25w variable resistor 58 is provided. During calibration, the motor is run at full load and the variable resistor adjusted so that the meter shows 100 percent load = 16.33v.

POWER SUPPLY

The d.c. power supply (FIG. 7) for the control electronics may be obtained by connecting the primary 70 of a power transformer 72 across a 110v a.c. line and center-tapping the 24 volt secondary 74. The upper portion of coil 74 is connected to the input of a bridge rectifier 75, consisting of our 3 amp-50v bullet-type silicon power diodes. The 1,000mf-50v capacitor 75 connected across the d.c. output may be employed to filter the ripple and store d.c. The d.c. supply voltage A+ (unregulated) is + 40 to 43v, and is available between output lead 76 and ground.

THE DELAYED REGULATOR

The circuit of the delayed regulator is shown in FIG. 8. The output of this circuit is regulated (A+ reg.) at 30v, but is delayed by 2.4 to 10 sec. after the start button is depressed. When the start is depressed, it gives +40v unregulated d.c. (A+) to terminal 101. $Q_1$ is a medium power PNP transistor 2N3645, whose emitter is clamped at fixed d.c. by the voltage divider formed by $R_2$ and $R_3$. The 50 uf capacitor $C_1$ has no charge at the instant when power is switched on at 101. This capacitor $C_1$ elevates $Q_1$ base to unregulated d.c. and starts charging through $R_1$ and the 100k potentiometer. The 100k pot. varies the charging time. As $C_1$ starts charging, $Q_1$ base starts going down and after a certain delay (T), which is 2.4 to 10 sec., $C_1$ charges enough to bring $Q_1$ base .6v below the clamped emitter level. This enables $Q_1$ to turn on; its collector draws current into $R_4$ and $R_5$, also providing the base current for $Q_2$, which turns on, and its collector is pulled to 0.2v due to the current through $R_6$. At the instant when the power is turned on, $C_3$ pulls $D_3$ anode to +40v, thus, instantaneously providing base current for $Q_3$, which comes on; its collector through $R_8$ comes down to 0.2v. $Q_3$ shorts the 30v zener diode to 0.2v, disabling emitter follower transistor $Q_4$, thus, not providing any output. After the delay time, $Q_1$ turns on, which in turn, turns on $Q_2$. $Q_3$ is a diode gate. When $Q_2$ collector comes to ground, it disables $Q_3$, and the short on the $D_z$ zener is removed. $R_8$ provides low zener current, and $Q_4$ acts as an emitter follower giving an output regulated at $D_z$ volts less than $V_{BE}$ drop of $Q_4$. (30.0 − 0.6 = 29.4v). $C_4$ serves to smooth the (A+ reg.) regulated output. $Q_5$ and $Q_6$ form a R-S flip flop. This flip flop is required to permanently unlatch $Q_3$ once the delay period is over. When first $Q_2$ turns on, it triggers $Q_6$ off and $Q_5$ on, whose collector is coupled through a diode to $Q_3$ gate. $D_6$ cathode is the reset point for the flip flop. The return of the start button resets this flip flop.

COIL DRIVER

FIG. 9 shows the coil driver and RED light driver circuitry.

The transistors $Q_8$ and $Q_9$ form an R-S flip flop. This flip flop has +40v on at all times. When the system power is first turned on, the RED light 22' lights up because capacitor $C_2$ is uncharged and pulls $Q_9$ collector to ground. The RED light is connected in the $Q_9$ collector circuit. The $D_{16}$ cathode is brought out to provide reset for the flip flop. The ground signal on pin L (from the stop button) turns off $Q_9$, turning the RED light off and turning $Q_8$ on. Whenever the start button is depressed and the RED light is not on, power transistor $Q_{10}$ (2N5294) turns on. The contactor relay coil 25 and start button holding coils are in $Q_{10}$ collector circuit. $Q_{10}$ emitter is connected to ground through the normally closed contact of JOG button 27. Hence, when the JOG button is depressed, $Q_{10}$ emitter does not connect to ground. Thus, the driver is disabled. However, in this mode, the ground is directly given to the coils, which energizes and closes the contacts to provide power to the motor.

$Q_7$ is a RTL logic transistor, with two resistor inputs. One is connected to the output of the RED threshold circuit at R, while the other one gets +40v through the stop button. Whenever any phase goes into RED mode, $Q_7$ turns on; its collector comes to ground which is diode couple to $Q_8$ base; $Q_8$ is turned off, and $Q_9$ is turned on, turning the RED light 22 on, and discharging $C_2$ through $Q_9$ and disabling $Q_{10}$, thus de-energizing the contactor coil 25 and stopping the motor 12. The capacitor $C_2$ allows for gradual return of the start button.

INPUT ISOLATOR

FIG. 5 shows the input isolator 23. This is an emitter follower consisting of $Q_{18}$ transistor (2N5294). This emitter follower provides impedance isolation. It isolates the low impedance sensor output 64 and provides high impedance to the window inputs on lead 115. R38 = 0, i.e., the collector of $Q_{18}$ is returned to +40v and $Q_{18}$ is mounted on a heat sink.

BLUE WINDOW

Transistors $Q_1$, $Q_2$, $Q_3$ and $Q_4$, together with associated passive components, form this window. It performs exactly the same way as described in detail in connection with FIG. 2 to light the BLUE light 19'.

GREEN WINDOW

Transistors $Q_5$, $Q_6$, $Q_7$, $Q_8$ with associated resistors and diodes form this window, which operates in the same manner to light the GREEN light 20'.

YELLOW WINDOW

Transistors $Q_{14}$, $Q_{15}$, $Q_{16}$ and $Q_{17}$ form this window to light the YELLOW light 21'.

RED THRESHOLD CIRCUIT

Transistors $Q_{12}$ and $Q_{13}$, together with illustrated resistors and diodes of FIG. 5, form this circuit. $Q_{12}$ is an NPN transistor. Its emitter is clamped to the selected threshold level by the voltage divider formed by resistors $R_{26}$ and $R_{27}$. $D_{13}$ and $D_{12}$ are biasing diodes. When the input voltage signal exceeds $V_e$ clamp $+V_{BE} + V_{D13} + V_{D12}$; $Q_{12}$ is turned on, providing base drive to $Q_{13}$, which provides a signal to turn on RED light 22'.

INTEGRATOR

FIG. 5 also shows the integrator 24. $R_{17} - C_1$ forms the timing circuit of the integrator. $C_1$ is capacitor 130. $Q_{10}$ and $Q_{11}$ provide gain for the circuit. Voltage divider $R_{21}$, $R_{22}$ clamps $Q_{11}$ emitter to some fixed d.c. level. Hence, unless $Q_{10}$ base rises by two diode drops above the $Q_{11}$ emitter clamp voltage, $Q_{10}$ and $Q_{11}$ will not turn on. $Q_9$ is a gating transistor, which stays saturated; and, thus, shorts timing capacitor 130 to ground when the GREEN window is on. Hence, when only the YELLOW and BLUE windows are on, $Q_9$ is released and $C_1$ starts charging through $R_{17}$. The only voltage it can charge is the input signal voltage. If $V_m$ is maximum signal voltage at any particular voltage and $v$ is the voltage on $C_1$ base when $Q_{10}$, $Q_{11}$ turn on, and $t$ is the integrator time, then:

$$V = V_m (1 - e^{-t/cr})$$
$$V/V_m = 1 - e^{-t/cr}$$
$$e^{-t/cr} = 1/[1-(V/V_m)]$$

Hence $t = cr \, log \, [1/(1 - V/V_m)]$

It can be seen from the above expression for time $t$, that as the warning overload increases, integrator time decreases. The output of $Q_{11}$ provides a base drive path for $Q_{13}$, the RED threshold transistor, which comes on to cut-off the motor via the driver circuit 17 of FIG. 9 and relay coil 25.

Thus, the invention as to both method and apparatus insures detection of worn bearings, deteriorating insulation, and other creeping overload conditions long before the motor breaker trips. Also, it guards against production line jams by acting as a circuit breaker. Always, there is provided continuous visual indication of motor load status.

Another feature resides in the absence of control buttons for the protective circuitry so that employees may not interfere with its 24-hour per day protection — only the motor is governed by a start and a stop button, as seen in FIG. 3, available outside of locked up circuitry.

1. A protective circuit for a current drawing load supplied by a source of energy comprising in combination, contactor means for connecting and disconnecting the load and the source; a plurality of magnitude sensitive means each responsive to a different range of current magnitudes; indicators respectively associated with each of said magnitude sensitive means; sensing means responsive to the load current to energize the indicators by actuating the magnitude sensitive means; threshold means responsive to a predetermined level of load current under control of the sensing means to actuate the contactor means to disconnect the load; further indicating means operated by the threshold means; and said magnitude sensitive means being selected to have respectively overlapping ranges of current magnitudes to which they are sensitive in order that more than a single indicator may be energized at a time.

2. The protective circuit of claim 1 wherein the load comprises a motor, and further comprising a jog switch means for by-passing the protective circuit to operate the motor independently thereof.

3. The protective circuit of claim 1 comprising an integrator circuit connected to be responsive at a predetermined point in one of said ranges to initiate timing for a predetermined time period if the motor remains operating at load current in accordance with or above said point, and to disengage the motor via said contactor if said predetermined amount of time elapses during said operation.

4. The protective circuit of claim 3 comprising means for resetting the integrator for timing said predetermined period if the motor load current causes operation below said point during said predetermined time period.

5. The protective circuit of claim 3 wherein the integrator circuit is characterized by an inverse slope characteristic relative to the load current characteristic whereby as the load current increases above the amount of load current corresponding to said predetermined point, the integrator circuit time decreases.

6. The protective circuit of claim 1 further comprising a delayed regulator for interposing a predetermined amount of time delay when the load is first receiving current to disable the protective circuitry until said predetermined time has elapsed.

7. A protective circuit for a current drawing load supplied by a multi-phase source of energy comprising in combination, a contactor means for connecting and disconnecting the load and the source; a plurality of magnitude sensitive means each responsive to a different range of current magnitudes; indicators respectively associated with each of said magnitude sensitive means; sensing means response to the load current in one phase to energize the indicators by actuating the magnitude sensitive means; threshold means responsive to a predetermined level of load current in said one phase under control of the sensing means to actuate the contactor means to disconnect the load; connection means from at least one of the magnitude sensitive means to actuate the contactor means to disconnect the load at a different predetermined value; further indicating means operated by the threshold means; and wherein each magnitude sensitive means comprises a solid-state circuit having upper and lower voltage-sensitive means respectively operative at the upper and lower ranges of current magnitudes.

8. The method of protecting a three phase electrical load from exposure to a current magnitude of predetermined amount and indicating load current trend comprising the steps of:

by sensing the energy level continuously applied to the load over one phase only;

detecting and indicating respective energy spectrums corresponding to different overlapping ranges of load current energy levels; and interrupting the energy supply to the load upon detecting a predetermined value of load current energy magnitude.

9. The method of claim 8 including the further step of interrupting the energy supply to the load when the load current remains above a lesser predetermined value for a predetermined period of time.

10. A protective circuit for a current drawing load supplied by a multi-phase source of energy comprising in combination, contactor means for connecting and disconnecting the load and the source; a plurality of magnitude sensitive means each responsive to a different range of overlapping current magnitudes; indicators respectively associated with each of said magnitude sensitive means; sensing means responsive to the load current in one phase to energize the indicators by actuating the magnitude sensitive means; threshold means responsive to a predetermined level of load current in said one phase under control of the sensing means to actuate the contactor means to disconnect the load; and connection means from at least one of the magnitude sensitive means to actuate the contactor means to disconnect the load at a different predetermined value.

* * * * *